United States Patent [19]

Dixon et al.

[11] Patent Number: 4,619,705

[45] Date of Patent: Oct. 28, 1986

[54] NONIONIC SURFACTANT TREATED CLAYS, METHODS OF MAKING SAME, WATER-BASED PAINTS, ORGANIC SOLVENT-BASED PAINTS AND PAPER COATINGS CONTAINING SAME

[75] Inventors: Dan M. Dixon, Gordon; Richard J. Drexel, Jr., Irwinton, both of Ga.

[73] Assignee: Engelhard Corporation, Edison, N.J.

[21] Appl. No.: 820,884

[22] Filed: Jan. 17, 1986

Related U.S. Application Data

[63] Continuation of Ser. No. 629,606, Jul. 11, 1984, abandoned.

[51] Int. Cl.⁴ .............................................. C04B 14/10
[52] U.S. Cl. ................................ 106/288 B; 106/309; 427/150
[58] Field of Search ........................... 106/288 B, 309; 427/150

[56] References Cited

U.S. PATENT DOCUMENTS

| | | | |
|---|---|---|---|
| 3,453,131 | 7/1969 | Fadner | 106/308 |
| 3,582,378 | 6/1971 | Miller | 106/309 |
| 3,615,806 | 10/1971 | Torock et al. | 106/72 |
| 3,726,700 | 4/1973 | Wildt | 106/300 |
| 3,798,044 | 3/1974 | Whitley et al. | 106/288 B |
| 3,804,656 | 4/1974 | Kaliski et al. | 106/308 Q |
| 4,014,709 | 3/1977 | Dykstra et al. | 106/300 |
| 4,030,941 | 6/1977 | Kunkle et al. | 106/309 |
| 4,087,284 | 5/1978 | Golden et al. | 427/150 |

*Primary Examiner*—Lorenzo B. Hayes
*Assistant Examiner*—Willie J. Thompson
*Attorney, Agent, or Firm*—Fisher, Christen & Sabol

[57] ABSTRACT

A dry clay product useful as a filler in organic solvent-based paints and water-based paints to impart improved gloss to dried films of the paints and in paper coatings to improve the gloss of paint films and paper coatings and to improve gloss ink holdout in paper coatings and comprising a mixture of a major amount of kaolin clay particles and a minor amount of a nonionic surfactant compatible with water and oil and having an HLB value in the range of 3 to 15. Methods of making the novel clay product and coating materials including paints and paper coatings containing same.

33 Claims, No Drawings

NONIONIC SURFACTANT TREATED CLAYS, METHODS OF MAKING SAME, WATER-BASED PAINTS, ORGANIC SOLVENT-BASED PAINTS AND PAPER COATINGS CONTAINING SAME

This application is a continuation of application Ser. No. 629,606, filed July 11, 1984, now abandoned.

BACKGROUND OF THE INVENTION

1. Field Of The Invention

The present invention relates to methods for treating kaolin clays for the purpose of obtaining an improved dried paint film gloss when incorporated in organic solvent-based paint formulations, and water-based paint formulations and for the purpose of imparting significantly improved gloss ink holdout in paper coating films. Numerous attempts have been made in the prior art in order to provide a filler clay material which when used as a high gloss filler for alkyd paints, latex paints, and paper coatings, provides improvement in sheet optical quality and improvement in gloss ink holdout properties, and requires less total coating solids.

2. Prior Art

It is well known and conventional to use inexpensive particulate materials such as refined clays and calcium carbonate to provide increased opacity in paints and paper. Various methods of improving the opacity, brightness, and gloss, among other properties of pigments and fillers, are known to those skilled in the art. In particular, titanium dioxide additions to coating systems containing pigments and fillers of low refractive indices substantially improved the opacities of those coating systems.

Clay is advantageously used as the entire mineral extender, in paints and coatings. Other typical extender materials include calcium carbonate, diatomaceous earth, and asbestine.

The mineral extenders of moderate cost that are generally commercially employed are the purified high kaolinite clays.

Methods of producing kaolin pigments are shown in U.S. Pat. No. 3,615,806. The kaolin pigment is obtained by delaminating kaolin clay particles of not less than five microns e.s.d. and then removing particles of less than two microns e.s.d., so that the remainder is the product used. The product is then dried and pulverized to produce the final product which is useful in exterior paints. The product will disperse in both aqueous and non-aqueous systems without any special chemical surface treatment. The resultant product has superior enamel holdout and hiding in the applied paint film, which thus has a very uniform low sheen. In a test paint formulation the product of the above-mentioned U.S. patent includes titanium dioxide, kaolin clay, Igepal 610, ethylene glycol, NH4OH as well as other ingredients. Although Igepal 610 is used in the final test paint formulation, there is no disclosure or suggestion of surface treating the clay particles with any surfactant prior to using the particles in the formulation of paints. In any event, this patent teaches away from the present invention by suggesting that surface treatment of clay with surfactants renders it useless in aqueous systems. Furthermore, the paints produced by this prior patent have a low sheen, not the improved gloss provided by this invention.

In U.S. Pat. No. 3,453,131, clay particles having a negative electrical charge are adhered to functional colloidal pigment particles by aliphatic organic acid which acts as a coupling agent. The composite particles are formed in aqueous suspension which can be used, or dried composite particles may be recovered. This is useful in cosmetic preparations, paint formulations, or wherever clay is used as a carrier for another particle used for coloration. There is no disclosure in this patent of the treatment of clay with a nonionic surfactant.

SUMMARY OF THE INVENTION

We have invented a method of treating clay and the resultant clay product which will produce a pigment or extender having unexpectedly, significantly improved glossing characteristics in organic systems, and also yields high gloss in water-latex systems. The novel clay product has improved dispersion properties in organic paint systems over similar clays not so treated. Also, the novel clay product will develop higher 20° angle gloss measurements in organic paint systems than a similar clay not so treated. The novel clay product has improved dispersion properties in organic paint systems over similar clays not treated. Furthermore, when used in a coating on calendered sheets, e.g., paper, significant improvement in gloss ink holdout properties and improved regular gloss is obtained compared to a product using a clay that has not been treated according to the present invention. The characteristics of the novel clay final product make it well suited for pigment, extender, or filler applications.

The improved clay products useful in organic solvent-based paints and water-based paints to improve the gloss of dried films thereof and in paper coating to improve the gloss ink holdout properties of paper coated therewith comprise a mixture of kaolin clay particles of the desired particle size and an effective amount of nonionic surfactant compatible with water and oil and having an HLB value in the range of 3 to 15, preferably 5 to 14. Suitable nonionic surfactants fitting this description are well known to those skilled in the pigments, fillers (extenders) and coatings arts.

One type of nonionic surfactants useful in this invention include the nonylphenoxypoly(ethyleneoxy) ethanol compounds having the average formula:

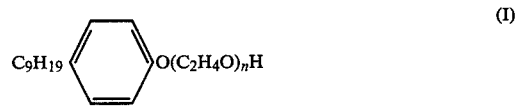
(I)

wherein n is a number of 4 to 12, preferably 7 to 9, and the compound has an HLB value of 3 to 15, preferably 5 to 14. Specific surfactants of this type are the Igepals (IGEPAL is a Registered Trademark) made and sold by GAF Corp. of Charlotte, N.C., including Igepal 610 having formula (I) given above in which n has an average value of about 7.82, and an HLB of 12.2, Igepal CO-210 having formula (I) wherein n has an average value of about 1.33 and an HLB of 4.6, Igepal CO-520 having formula (I) wherein n has an average value of about 5.4 and an HLB of 10.0, Igepal CO-720 having formula (I) wherein n has an average value of about 12.9 and an HLB of 14.2 and the like.

Another type of nonionic surfactants useful in this invention includes the condensates of ethylene oxide condensed with hydrophobic condensates formed by condensing propylene oxide and propylene glycol. This type of nonionic surfactant can be depicted by the average formula:

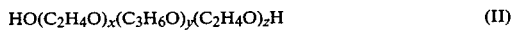

in which x, y and z are numbers of such relative values to provide an HLB value in the range of 3 to 15, preferably in the range of 5 to 14. Specific surfactants of this type include the Pluronics sold by BASF Wyandotte Industrial Chemical Group, specifically Pluronic L-72 having an HLB of 6.5, Pluronic L-31 having an HLB of 4.5, Pluronic L-64 having an HLB of 15 and the like. The Pluronics, however, may present an odor problem when clay products containing them are spray dried or when they are otherwise subjected to elevated temperatures and thus they are less preferred than the Igepals such as Igepal 610.

The proportion of nonionic surfactant in the novel mixture of clay and surfactant is not narrowly critical and can range upwardly from a minimum effective amount, that is, the minimum amount that provides improvement in gloss of dried films of coatings (oil-based or water-based) made from the novel mixture or in gloss ink holdout properties of paper coatings made from said novel mixture. There is no sharp upper limit on the relative amount of nonionic surfactant used in the novel mixtures, although, because of cost considerations, the lowest optimum amount of surfactant usually will be used. Numerically, the amount of nonionic surfactant can be varied from an effective amount up to about 5 weight %, preferably up to about 2 weight %, based on the combined weight of clay and nonionic surfactant in the mixture. More specifically, the amount of nonionic surfactant can be varied from about 0.75 weight % to about 1.25 weight % on the same weight basis.

Other examples of nonionic surfactants having an appropriate HLB value falling within the above-described ranges can be found by reference to standard publications such as McCutcheon's 1982: Combined Edition, published by McCutcheon's Division MC Publishing Company, 175 Rock Road, Glen Rock, N.J. 07452, or earlier editions such as McCutcheon's: Detergents and Emulsifiers, published by Allured Publishing Company, Ridgewood, N.J., 1974. In addition, trade publications such as "Technical Data on Pluronic Polyols", OS 796, published by BASF Wyandotte Corporation, Organic Specialties & Fine Chemicals Dept., Parsippany, N.J. 07054, can be consulted for further examples of nonionic surfactants usable in this invention.

The clay used in the novel mixtures of this invention can be of any suitable type that has been mined and refined in conventional ways to filler, extender or pigment grade for paints or paper coatings. For best results, a high brightness, small particle size kaolin clay is preferred. Clays having a TAPPI brightness of 80 or more, preferably 90 or more, and having a particle size of at least 65%, preferably at least 90%, below 2 microns can be employed in the novel mixtures. It is also preferred to use a clay which does not contain substantial amounts of soluble salts; for example, the preferred clay contains less than 0.2 weight % soluble salts. It is also preferred that the clay have a Hegman value of about 5 to about 6 when mixed in dry form with raw linseed oil and drawn down on a Hegman gage (Gardner, Model No. GG64048) scaled from 0 to 8 equal segments and measuring the number of the segment where separation of high grit area from mostly grit-free area occurs.

Kaolin clay useful in this invention generally is obtained by well known processes in which the crude clay is degritted, screened, refined by electromagnetic separation, flotation and/or chemical means. Thereafter, the refined clay is classified by particle size, or delaminated, and then bleached and filtered. Optionally, the refined clay thus obtained can be dried and/or calcined prior to treatment with the nonionic surfactant pursuant to this invention, although, for economic reasons, it is satisfactory to treat the wet clay filter cake directly with nonionic surfactant before drying or calcining.

The method for making the novel clay product of this invention is easy to carry out and simply comprises the steps of mixing an aqueous slurry of clay particles and an effective amount of a nonionic surfactant of the type described above which is compatible with water and oil and has a HLB within the range of 3 to 15, preferably 5 to 14, and thereafter drying the resulting mixture to provide the desired novel clay product. The clay slurry can be prepared in any suitable manner, for example, it can be prepared by mixing clay filter cake with a suitable amount of water to provide a slurry that is convenient to handle. Typically, slurries containing 40 to 66 weight % clay solids are useful in the novel method. The slurry can alternatively be made up by adjusting the water content of the clay slurry after magnetic separation or flotation or other chemical purification of the crude clay or the slurry from classifiers and/or delaminators can be used with appropriate adjustment to provide a slurry that can be readily handled. There is no advantage in preparing the slurry from dried clay or calcined clay and there are ample economic disadvantages in doing so. Nevertheless, if one so desires, the slurry can be prepared from dried or calcined clay. Still alternatively, the clay slurry before or after the bleaching step in the usual refining of clay can be employed with suitable adjustments in solids by the addition or removal of water.

In order to maintain an adequate amount of fluidity to enable ease of handling of the slurry, it is preferable to add an alkaline material, e.g. for purposes of deflocculation. Many alkaline materials serve as dispersing agents for this purpose such as tetrasodium pyrophosphate otherwise known as TSPP. In those instances where it is desired to maintain the soluble salt content in the clay product as low as possible, it is preferred not to use TSPP or any other salt additive or salt forming additive. In such cases ammonium hydroxide or ammonia are used. When ammonium hydroxide or ammonia are used, subsequent heating of the clay drives off the volatile alkaline material leaving little or no soluble salt. For this reason, ammonium hydroxide is preferred and it has been found to be useful within the range of 0.15 to 0.3 weight % based on the dry weight of the clay, although amounts above or below this range are also suitable.

The nonionic surfactant is added to the alkalinized clay slurry and stirred for a short period of time until the slurry is substantially homogeneous. If stirring proves to be difficult because of thickness of the slurry, additional amounts of alkaline material can be added. The slurry can be used with or without further modification in coating formulations, e.g. water-based paint formulations and/or paper-coating formulations.

It is usual practice, however, for the clay refinery to spray dry the slurry to reduce the water content to a low level, e.g. not more than 5 weight % moisture, preferably not more than 1 weight % moisture and most preferably not more than 0.1 weight % moisture based on the dry weight of the clay. The resulting product is then sold in dry form or it can be further pulverized to provide a desirable Hegman grind value. As pointed out above, a suitable Hegman value is 5 to 6 although, depending upon the application of the clay product, other Hegman grind values are suitable.

It is believed that the dried novel product, that is, one containing not more than 5% moisture comprises particles of clay which are at least partially coated with the nonionic surfactant as described above.

More specifically, the process used to produce surface treated clay pursuant to this invention for use in a paint or paper coating formulas is exemplified as follows:

(1) Meter an appropriate amount of clean well water into a suitable size cone bottom tank, equipped with a propeller agitator and valve in the bottom.

(2) With continuous agitation, add slowly a suitable amount of concentrated $NH_4OH$.

(3) Then slowly add the refined kaolin clay (e.g. Freeport wet Al-Sil-Ate HO-90 acid filter cake).

(4) When the above mixture becomes homogeneous, slowly add the Igepal CO-610 (or other nonionic surfactant) and mix until the slurry is again homogeneous.

(5) Pump the above mixture to a gas fired utility Niro spray dryer where the mixture is dried to the desired moisture level, e.g., until it contains less than 5% moisture. The dried treated product is then collected.

(6) Pulverize (or Bauer mill) the material obtained from step 5 using processing conditions that yield the desired Hegman value, e.g., 5 to 6 Hegman grind test value, in product.

(7) The product is collected and is then ready for use in paint or paper formulas.

Wetting agents of the low foaming, oil soluble, nonionic surfactant type, such as Igepal CO-610, Pluronic L-72 and others as mentioned hereinabove, yield a final clay product that is more "oil-loving" (oleophilic) and wets-out more easily than does regular Al-Sil-Ate HO-90 (AL-SIL-ATE is a Registered Trademark).

The dry, finely ground kaolin clay product produced by the novel of this invention has a very fine particle size, 92% by weight below 2 microns, and is characterized by a TAPPI brightness of at least 90. These products are very well suited for use as pigments or fillers in the manufacture of paper or paints.

The treated kaolin clay of the present invention is useful for development of high gloss in organic solvent type paint systems and also develops improved gloss and high viscosity in water based paint systems to aid in the prevention of wet paint film sag on vertical surfaces. In paint systems, the novel clay product of the present invention is capable of developing higher 20° angle gloss measurements in organic paint systems than the same clay not treated with the Igepal CO-610 or similar nonionic wetting agents. The novel clay of the present invention has improved dispersion properties over similar clays in organic paint systems not having the necessary treatment with nonionic surfactant.

In paper products, the clay of the instant invention provides significant improvement in gloss ink holdout properties as well as slightly improved regular gloss (no ink or not printed) of coated calendered sheets as compared to a similar product using clay which has not been surface treated according to the present invention.

The Hegman grind measurement is performed to ensure the provision of a final treated clay product which is of benefit to the paint manufacturer in that less mechanical mixing is required in order to produce an acceptable paint. Therefore, from a commercial standpoint the Hegman grind measurement is important; nonetheless, the clay product of the present invention may be subjected to grinding operations to differing Hegman grind measurements than that preferred and still results in a useful novel clay product.

The novel coating materials of this invention containing the novel clay product produced in the manner described above in accordance with this invention generally comprise a binder, a volatilizable vehicle and a filler including the novel clay product. Suitable binders are well known in the paint industry and paper coating industry. For example, in an oil-based paint, the binder can comprise any one or mixture of drying oils including oily organic liquids or unsaturated fatty oils which, when applied to a surface as a thin film, readily absorb oxygen from the air and form tough elastic substances by "drying", i.e. by hardening or solidifying through oxidative reactions involving the interaction by oxygen in the air with the unsaturated sites in the drying oil molecule. It is currently believed that the "drying" process involves polymerization of conjugated diene or triene groups through a Diels-Alder type addition. Drying oils typically belong to the linolenic acid group of triglyceride esters. Synthetic drying oils are known but the most common drying oils are natural products obtained from soybean, candle nut, linseed, hemp, grapefruit seed, orange seed, English walnut, wheatgerm and any of the usual tung oil sources. Drying oils are also obtained from fish oils and dehydrated castor oils.

Especially useful binders for oil-based paint purposes include the drying oil alkyds such as the long-oil soya alkyds. The oil-based paints pursuant to this invention also contain a volatilizable liquid such as mineral spirits or other suitable volatilizable solvent for the drying oil or drying oil alkyd and vehicle for the pigment and/or filler.

In addition to the clay product of this invention included in the coating materials of this invention as filler, there can also be used conventional fillers and pigments such as titanium dioxide and other commonly used fillers and pigments. Additionally, the novel oil-based pigments of this invention can include drying metal salts such as calcium naphthanate. Furthermore, the novel oil-based paints can also include anti-skin agents, loss of dry inhibitors and any other additives conventionally used for oil-based paints.

The water-based paints of this invention include binders which are suspensions of polymeric polymers such as vinylacetate-N-butylacrylate copolymers or other acrylic resins and copolymers suspended in an aqueous medium in which the pigment and/or filler is also suspended. The novel clay product of this invention is easily dispersible in the water-based paint composition and can be substituted for part or all of the pigment heretofore employed in such water-based paint compositions. A wide variety of additives as heretofore employed in water-based paints such as thickeners, anti-fungus agents and the like can be added to the novel water-based compositions.

The novel clay products of this invention can be used in conventional paper coating compositions in place of some or all of the pigment or filler heretofore employed in such compositions. Paper coating compositions normally contain a binder such as a coalescable organic polymer such as styrene divinylbenezene copolymers, acrylic resins and other vinyl addition polymers and copolymers as well as natural binders including starch. Upon drying the particles of polymer coalesce on the paper surface and around the pigment and filler particles to form a strongly adhering coating on the paper. Paper coating compositions can include other materials such as thickeners including carboxy methyl cellulose and other similar materials.

DETAILED DESCRIPTION OF THE INVENTION

The following examples are presented wherein abbreviations used are explained below:
sec: second
min: minute
hr: hour
lb: pound weight
t: short ton of 2,000 lb
um: micron (micrometer)
ft: foot (feet)
M: mesh, U.S. standard sieve designation
ml: milliliter
gal: U.S. gallon
g: gram
%: percent, by weight unless otherwise indicated
kG: kilogauss, unit of magnetic intensity
temperature: °F unless otherwise indicated
brightness: TAPPI brightness as measured with a Technidyne Model S-4 Brightness Tester
% −2 um: % of particles of a size less than 2 um as measured with a Micromeritics Sedigraph (SEDI-GRAPH is a Registered Trademark) 5000
% grit: % particles in a sample having a size greater than 44 um (325 M)
PVC: pigment volume concentration $$= \frac{\text{Volume of Pigment}}{\text{Volume of pigment + Volume of binder}}$$

wherein pigment is taken to include filler and extender as well as pigment, e.g., it includes $TiO_2$, talc, clay, calcium carbonate and any other solid particle other than binder particles contained by the paint.

The improved clay for use in organic paint formula is more "oil-loving" (oleophilic) and wets out more easily than does regular Al-Sil-Ate HO-90. The clay is kaolin clay and is useful as a pigment for use as a high gloss filler for alkyd paints, latex paints, and paper coatings. The clay yields high gloss in water-latex systems, and yields significantly improved dried film gloss in organic paint formulas. Gloss values given hereinafter were determined pursuant to ASTM D523.

The 20° gloss values given in the examples below are only comparable within each example or example grouping. For instance, the 20° gloss values given in Example 2 are comparable with each other but not with the 20° gloss values given in other examples. In another instance, the 20° gloss values given for the example grouping of Example 3, A and B are comparable with each other but not with the values given for other examples or example groupings. The 20° gloss values given within any particular example or example grouping were obtained on films produced by simultaneous drawdowns on the same drawdown sheet. Also, in some examples or example groupings, a sensor head different from that used in other examples or example groupings were used.

EXAMPLE 1

(A) The novel product of the present invention was produced according to one preferred embodiment as follows. Eight gallons of clean well water were metered into an appropriate size cone-bottom tank, equipped with a propeller agitator and valve in the bottom of the tank. With continuous agitation, 0.15 lb. of concentrates $NH_4OH$ (about 30 wt. % $NH_3$) was slowly added. It is desired that as little $NH_4OH$ as possible be added, and in a preferred process most of that $NH_4OH$ is lost upon drying which helps achieve a low soluble salt content in the final product. This is important in automotive primers for electro-deposition to prevent blistering.

The amount of ammonium hydroxide used was approximately 0.15% of the concentrated ammonium hydroxide solution based on dry weight of the kaolin feed stock. The ammonium hydroxide was used to provide the 65% solids slurry with sufficient fluidity to allow it to be pumped to the spray dryer atomizer. Low slurry solids, for example about 50% solids, would require somewhat less ammonium hydroxide for acceptable fluidity. The range of ammonium hydroxide used may vary from 0.1% or less to 0.3% or more in the preferred embodiment. In those cases where the presence of significant amounts of soluble salts can be tolerated, other alkaline materials, e.g., TSPP, sodium hydroxide and the like, can be used in place of ammonium hydroxide.

With continuous agitation, 142.9 lbs. of wet clay (Al-Sil-Ate HO-90 acid filter cake) having 70% solids (100 lbs. dried divided by 7 equals 142.9 wet filter cake) were added to the mixture aqueous ammonium hydroxide solution. The clay filter cake was relatively free of soluble salts.

Average values of the physical properties of the clay filter cake used are shown in Table 1 below:

TABLE 1

| Physical Properties Average Values: | |
|---|---|
| Fineness (residue on 325 mesh) | 0.01% |
| Particle Size (Below 2 micrometers) | 92% |
| Median Particle Size (micrometers) | 0.5 |
| TAPPI Brightness (TAPPI 646 os-75) | 90–92% |
| Elrepho Brightness ISO (TAPPI 534 pm-76) | 88–90% |
| Oil Absorption (ASTM D281) | 40–45 g. |
| pH, 10% Solids | 6.0–8.0 |
| Free Moisture (Dry Clay) | 1.0% Maximum |
| Specific Gravity | 2.62 |
| Bulking (gallons/lb.) | .0459 |
| Refractive Index | 1.56 |
| Shipping Solids for Slurry | 69.5–70.5% |
| Weight per Gallon of Slurry @ 70% Solids | 14.7 Pounds |
| Dry Clay Weight per Gallon @ 70% Solids | 10.3 Pounds |

A typical chemical analysis of the clay filter cake is shown in Table 2 below:

TABLE 2

| | |
|---|---|
| $Al_2O_3$ | 39.04% |
| $SiO_2$ | 45.94% |
| $Na_2O$ | 0.24% |
| $TiO_2$ | 0.45% |
| CaO | 0.03% |
| $Fe_2O_3$ | 0.40% |
| MgO | 0.02% |
| $K_2O$ | 0.08% |
| Ignition Loss | 13.80% |

The mixture of clay, water and NH$_4$OH was then agitated until homogeneous. When homogneeous, 1 lb. of Igepal CO-610 was added slowly with continuous agitation until the slurry was again homogeneous. If the Igepal CO-610 is added rapidly, a slight thickening may result.

The above-described mixture of water, NH$_4$OH, acid clay filter cake, and Igepal CO-610 was sufficiently agitated until homogeneous. Thereafter it was pumped to a pilot plant, gas-fired, utility Niro spray dryer wherein the mixture was dried to 0.5% moisture or less. The dried product was then pulverized (e.g. Bauered in a Bauer disk mill) using process conditions necessary to yield a product having a 5 to 6 Hegman grind test value.

The product was collected and was suitable for use in paint or paper formulas. The product has the physical and optical properties as shown in Table 3.

TABLE 3

| | |
|---|---|
| Brightness, Tappi (1) | 90.0 |
| Particle Size | 100% below 3.8 micrometers |
| | 92% below 2.0 micrometers |
| | 75% below 1.0 micrometers |
| | 55% below 0.5 micrometers |
| | 30% below 0.25 micrometers |
| pH-10% Solids in Water | 5.0–6.0 |
| % Soluble Salts | 0.2 |
| Hegman Grind (2) | 5.0–6.0 |
| Oil Absorption (3) | 42–46 |

(1) TAPPI Provisional Method (1976) T 534, Appendix using filter designated "A".
(2) Measured by mixing dry sample in raw linseed oil, placing the mixture in a small cavity, scraping it from the cavity down a slot scaled from 0 to 8 equal segments, and measuring the number of the segment where separation of high grit area from mostly grit-free area occurs.
(3) ASTM D281-31.

EXAMPLE 2

An oil-based gloss alkyd enamel (35 PVC) was prepared by first mixing at low speed the liquid ingredients given in Table 4 below in a high shear Premier Mill. The solids set forth in Table 4 below were thereafter added to the liquids and the mixing was continued at high speed to grind the ingredients together. When a uniform mix was attained the ingredients given in Table 5 were added in the order listed and mixing was continued until a uniform mixture was obtained. Thereafter, the resulting paint was pulled down on a standard drawdown sheet using a standard drawdown bar and equipment to provide a three mil coating. In addition, a paint prepared in the same manner except using a clay (Al-Sil-Ate HO-90 acid filter cake used as the starting material in Example 1) was employed in place of the novel clay product produced in Example 1 and used as an extender in preparation of the oil-based alkyd paint listed above. The resulting oil-based alkyd paint made from the clay not treated pursuant to Example 1 was also drawn down on the same drawdown sheet in the same manner as described hereinabove. The paints drawn down on the drawdown sheet as described above were allowed to dry for two or three days. Thereafter, the 20° gloss values were measured (ASTM D523) using a Gardner apparatus in which light is directed on to the dry coating of paint at a 20° angle from the vertical and the reflected light is measured by a sensor head looking straight down at the dried paint coating. In the case of the paint made with the novel clay product produced by Example 1, the 20° gloss value was 40 to 50 whereas the 20° gloss value of the paint made from the clay not treated with nonionic surfactant amounted to only 20 to 30.

TABLE 4

| Materials | Lbs./100 Gal. |
|---|---|
| Rutile TiO$_2$ | 250 |
| Clay (Example 1) | 250 |
| Aluminum Stearate | 2.0 |
| Loss of Dry Inhibitor (1) | 3.0 |
| Aroplaz 1266-M-70 (2) | 362 |

(1) Nuact NOPB (Tenneco) lead-free metal salt of organic acid in solution.
(2) A long-oil soya alkyd as a 70% solids solution in mineral spirits (2.0 mm Hg vapor pressure) and having a viscosity of 23–36 Stokes at 25° C., an acid value (solids) of 5 to 10, and a Gardner color of 7 max.

TABLE 5

| Materials | Lbs./100 Gal. |
|---|---|
| Aroflat 3113-P-30 (3) | 200 |
| Mineral Spirits | 30 |
| 6% Ca Naphthanate | 5.0 |
| 6% Cobalt Naphthanate | 3.0 |
| 6% Zirconium Naphthanate | 5.0 |
| Anti Skin Agent (4) | 2.0 |

(3) A modified oxidizing alkyd as a 30% solids solution in Type 140 solvent, and having a viscosity of 6.3 to 18 strokes at 25° C., an acid value (solids) of 5 to 10, and a Gardner color of 6 max.
(4) Exkin #2, Tenneco methylethylketoxime.

Normally, white, gloss alkyd formulas contain all titanium dioxide with no or very little extender, i.e. clay, and PVC levels are normally very low. A gloss alkyd formula containing 50% clay extender (based on the combined weight of extender and titanium dioxide pigment) at 35 PVC is very uncommon due to poor gloss development by heretofore known paints.

EXAMPLES 3, A and B

In each case the oil-based gloss alkyd enamel formulation prepared as described in Example 2 was prepared except that in Example A the competitive material, ASP-170 clay sold by Engelhard Minerals and Chemical Corporation, Menlo Park, Edison, N.J., was substituted on a lb. for lb. basis and in Example B untreated clay, HO-90, was used in place of the clay prepared pursuant to Example 1. In Example 3, the clay prepared as described in Example 1 was used. In this comparison each paint formulation was drawn down in a typical manner as described in Example 2 and the 20° gloss was measured and the results are given in Table 6 below:

TABLE 6

| Ex. | | 20° Gloss |
|---|---|---|
| A | Competitive Material, ASP-170 | 27.6 |
| B | Untreated HO-90 | 14.1 |
| 3 | Treated Clay (Example 1) | 28.7 |

EXAMPLES 4 and C

In these examples the gloss alkyd enamel formulation described in Example 2 was used. In Example 4 the paint described in Example 2 was drawn down next to an identical paint made, however with the untreated clay, HO-90 pulverized once and substituted lb. for lb. for the treated clay made pursuant to Example 1. The 20° gloss values were determined and are 37.6 for the paint containing the clay treated pursuant to Example 1 and 27.7 for the untreated HO-90 clay pulverized once.

EXAMPLES 5 and D

A paint product made pursuant to Example 2 was drawn down alongside a paint of the identical formulation made, however with the competitive material, ASP-170 substituted for the treated clay treated according to Example 1 and the 20° gloss values were measured after the paint dried and hardened. For the paint containing the treated clay, the 20° gloss value was 23.1 and for the paint containing ASP-170, the 20° gloss value was 23.

EXAMPLES 6 and E

In this comparison, a paint similar to that prepared in Example 2 containing clay treated pursuant to Example 1 was drawn down alongside a paint of the identical composition except that untreated clay, HO-90, was pulverized once and substituted lb. for lb. for the treated clay. 20° gloss values were determined and found to be 31.4 for the dried paint film made from the paint containing the treated clay compared to 22.6 for the paint containing the untreated HO-90 clay.

EXAMPLES 7 and F

A novel product of this invention was produced in the same manner as described in Example 1 with the exception that instead of adding Igepal CO-610, Pluronic L-72 was substituted on a wt. for wt. basis. Pluronic L-72 can be illustrated by the formula $$HO(C_2H_4O)_x(C_3H_6O)_y(C_2H_4O)_zH$$

wherein x, y and z are of such relative values that the surfactant possesses an HLB of 6.5.

The resulting dried clay product treated with Pluronic L-72 was then made up into a paint formulation identical to that disclosed in Example 2 except that the Pluronic L-72 treated clay was employed in place of the Example 1 clay product. The resulting gloss alkyd enamel was drawn down on a drawdown sheet side by side with an identical enamel in which the commercial extender, ASP-170, represented the best clay extender heretofore. The contrast ratio, reflectance white, 85° gloss, 75° gloss and 20° gloss properties were all measured and the comparative values are given in Table 7. These results demonstrate the comparability of the novel clay treated with nonionic surfactant with the best available commercial material and illustrate even better gloss properties than the best available clay.

TABLE 7

|  | Example F ASP-170 | Example 7 Clay Treated With Pluronic L-72 |
| --- | --- | --- |
| Contrast Ratio | 98.2 | 98.1 |
| Reflectance White | 87.1 | 87.2 |
| 85° Gloss (1) | 94.7 | 95.2 |
| 75° Gloss (1) | 95.8 | 97.0 |
| 20° Gloss (1) | 32.0 | 40.6 |

(1) ASTM D523

EXAMPLES 8 and G

A comparison was made of drawdowns of a paint prepared as described in Example 7 from HO-90 clay treated with Pluronic L-72 as described in Example 7. The comparison paint was made of the same composition except untreated HO-90 was dispersed with ammonium hydroxide and pulverized once to form a paint of Example G. In Example 8 the 20° gloss measurement was 33 whereas in Example G for the clay, HO-90, treated with ammonium hydroxide but not nonionic surfactant, the 20° gloss was 17.9.

EXAMPLES 9, 10 and H

A three-way comparison was made from paints made by the same paint formulation, i.e. that described in Example 2 except that in Example H the competitive clay, ASP-170 was used. In Example 9, clay HO-90 treated with Igepal RC-520 was used as the clay component. In Example 10, clay HO-90 treated with Igepal CO-610 as described in Example 1 was used as a clay component. The 20° gloss value for Example H (the competitive material ASP-170) was found to be 36.6. In the case of Exhibit 9 (clay HO-90 treated with RC-520) the 20° gloss value was 26.8. In Example 10 (Clay HO-90 treated with Igepal CO-610) the 20° gloss value was found to be 34.5.

EXAMPLES 11 and J

In each of these examples, a water-based semi-gloss latex paint (25 PVC) was prepared by first mixing the liquid ingredients given in Table 8 below in a high shear premier mill. The solid ingredients set forth in Table 8 were thereafter added to the liquid ingredients and mixing was continued at high speed to grind the ingredients together. In Example J, the clay used was the commercial product ASP-170 sold by Engelhard Minerals and Chemical Corporation. In Example 11, the clay was produced in the manner described in Examples 7 and F utilizing a nonionic surfactant, Pluronic L-72. When a uniform mix was obtained, the ingredients listed in Table 9 were added in the order listed and mixing was continued until a uniform mixture resulted. Thereafter, each of the resulting paints obtained in Examples 11 and J was pulled down on a standard drawdown sheet using a standard drawdown bar and equipment to provide a three mil coating. The paints thus drawn down on the drawdown sheet were allowed to dry for a few hours. Various measurements were made on the films made from the paints and are given in Table 10 below.

TABLE 8

| Propylene Glycol | 43.0 |
| --- | --- |
| Water | 208.0 |
| Colloid 681-F (1) | 2.0 |
| Natrosol (2) | 4.0 |
| Super-Ad-It (3) | 1.0 |
| AMP-95 (4) | 2.0 |
| Tamol 731 (5) | 6.0 |
| CR-800 (6) | 150.0 |
| Clay | 50.0 |

(1) Defoamer
(2) Cellulosic thickener
(3) Preservative
(4) Aminomethylpropanol pigment dispersant
(5) Pigment dispersant
(6) Rutile titanium dioxide

TABLE 9

| Texanol (7) | 12.0 |
| --- | --- |
| Amsco 3011 (8) | 400.0 |
| Colloid 681-F (1) | 1.0 |
| H$_2$O | 100.0 |
| Natrosol 2% (2) | 100.0 |
| Igepal CO-610 | 2.0 |
| Triton GR-7 (9) | 2.0 |

(7) Ester alcohol coalescing agent
(8) Vinyl acetate-acrylate copolymer latex (55% solids) sold by Union Chemical Company, Charlotte, N.C.
(9) Sulfonated alkyl ester surfactant to improve wetting of surface being painted

TABLE 10

|  | Ex. J | Ex. 11 |
| --- | --- | --- |
| Contrast Ratio (1) | 97.7 | 97.5 |
| Reflectance White (2) | 90.0 | 90.2 |
| 85° Gloss (2) | 84.5 | 85.2 |
| 75° Gloss (2) | 73.8 | 74.6 |
| Tint Reflectance (2) | 26.2 | 26.0 |
| 20° Gloss (2) | 4.5 | 4.5 |
| Soluble Salts | 0.15** | .099* |
| Hegman | 4.0** | 5.0* |

(1) Hiding power, ASTM method D-2805
(2) ASTM D523
*Of the treated clay made pursuant to Example 7
**Of ASP-170

EXAMPLES 12, K and L

Paper coating colors were prepared from the ingredients listed in Table 11. The parts and percentages given in Table 11 are on a weight basis.

TABLE 11

|  | Ex. 12 Ex. 1 Treated Clay | Ex. K Lustra 90 | Ex. L Lustra 90 |
| --- | --- | --- | --- |
| Formula: |  |  |  |
| Pigment, Parts |  |  |  |
| Clay treated by Example 1 | 100 | — | — |
| Lustra 90 (1) | — | 100 | 100 |
| Binder, Parts |  |  |  |
| Penford 280 Starch (2) | 3.6 | 3.6 | 3.6 |
| Dow 620 Latex (3) | 15.5 | 15.5 | 15.5 |
| Additives, % |  |  |  |
| CMC (Dry on Dry Solids) (4) | 0.10 | 0.10 | 0.10 |
| Parez 707 (Dry on Dry Solids) (5) | 0.75 | 0.75 | 0.75 |

(1) Kaolin clay produced in the same manner as Al-Sil-Ate HO-90 and having the particle size distribution given in Table 11.
(2) Medium viscosity starch.
(3) Carboxylated styrene butadiene copolymer 50% solids by weight having a pH of 6 and a Brookfield viscosity of 95 cps, 100 rpm.
(4) Carboxymethylcellulose thickener.
(5) Methylated trimethylol melamine. Crosslinker for starch to impart water proofness.

The physical properties and particle size distribution of the treated clay used in Example 12 and the Lustra 90 used in Examples K and L are set forth in Table 12 below.

TABLE 12

| | Pigment Data | |
| --- | --- | --- |
| Product | Ex. 1 Clay | Lustra 90 |
| Tests |  |  |
| Brightness |  |  |
| G.E. (Tappi) | 90.2 | 90.6 |
| Elrepho (Absolute) (1) | 87.5 | 88.2 |
| Color (2) |  |  |
| L | 96.70 | 96.82 |
| a | −0.09 | −0.05 |
| B | 3.45 | 3.08 |
| Y.I. (German) (3) | 6.54 | 5.87 |
| W.I. (Stensby) (4) | 86.08 | 87.43 |
| Particle Size Distribution |  |  |
| 100% Below Microns | 4.7 | 7.0 |
| % Below 5 Microns | — | 98 |
| % Below 2 Microns | 91 | 90 |
| % Below 1 Microns | 76 | 76 |
| % Below 0.5 Microns | 52 | 54 |
| % Below 0.25 Microns | 23 | 29 |
| Mean (Micron) | 0.48 | 0.45 |

(1) Determined by TAPPI Standard T534 pm 76.
(2) Determined by CIE 1976 (L*a*b*) formula as described in "Color research and application", Vol. 2, No. 1, Spring 1977, pp. 7–11, John Wiley & Sons, Inc.
(3) German Yellowness Index calculated from x, y and z values as measured on Elrepho and standardized as "absolute" with BaSO$_4$.
(4) Calculated as equaling L-3b + 3a.

The resulting formulations were characterized by the properties set forth in Table 13 below.

TABLE 13

| Tests: | Ex. 12 | Ex. K | Ex. L |
| --- | --- | --- | --- |
| Solids, % | 59.3 | 59.3 | 62.0 |
| Viscosity Brookfield, Cps No. 3 Sp., 76° F. |  |  |  |
| 100 RPM | 473 | 406 | 640 |
| 50 RPM | 680 | 616 | 988 |
| 20 RPM | 1225 | 1160 | 1855 |
| 10 RPM | 2000 | 1940 | 3110 |
| Hercules "E" Bob, 80° F. |  |  |  |
| Dynes @ 4400 RPM | 30.8 | 15.8 | 26.8 |
| Cps | 53.5 | 72.4 | 46.5 |
| pH | 9.6 | *9.4 | *9.4 |

*Lustra 90 coatings pH adjusted with 1:1 aqueous NH$_4$OH solution.

In each case the resulting coating formulations were applied (trailing blade, C-1-S, wire side) to 45 lb. (3300 ft.$^2$ ream) 82 brightness (Tappi) rawstock at approximately 8 lbs. coat weight. The coated sheets were forced dried, cured at 105° C. then conditioned in the constant temperature and humidity room prior to super calendering (2 nips/side, 1000 P.L.I., 150° F.).

Table 14 given below sets forth the test data for the rawstock, and Examples 12, K and L. The gloss brightness and opacity data are given for the pre-calendered and calendered condition of the paper. These data show substantially better ink gloss for the coating made with the clay treated pursuant to the present invention while the other listed properties were at least comparable if not better for the paper coated with the coating containing clay treated pursuant to the present invention as compared to examples K and L in which the same clay was not treated pursuant to this invention.

TABLE 14

| | Rawstock and Coated Sheet Data | | | |
| --- | --- | --- | --- | --- |
| Description | Rawstock | Ex. 12 | Ex. K | Ex. L |
| Identification | — | — | Lustra 90 | Lustra 90 |
| Coating Solids, % | — | 59.3 | 59.3 | 62.0 |
| Tests |  |  |  |  |
| Basis Wt., O.D. Lbs./3300 ft$^2$ | 43.4 | 51.3 | 51.2 | 51.3 |
| Coat Wt., O.D. Lbs./3300 ft$^2$ | — | 7.9 | 7.8 | 7.9 |
| Gloss: |  |  |  |  |
| Pre-calendered | — | 17 | 20 | 21 |
| Calendered | — | 71 | 67 | 67 |
| Brightness: |  |  |  |  |
| Pre-calendered |  |  |  |  |
| G.E. (Tappi) | 81.8 | 83.9 | 83.2 | 83.1 |
| Elrepho (Abs) | 82.2 | 82.7 | 82.2 | 82.1 |
| Calendered |  |  |  |  |
| G.E. (Tappi) | — | 81.8 | 81.4 | 81.2 |
| Elrepho (Abs) | — | 79.2 | 79.1 | 79.0 |
| Opacity, Tappi: |  |  |  |  |
| Pre-calendered | 89.8 | 93.6 | 93.0 | 92.8 |
| Calendered | — | 91.3 | 91.0 | 90.8 |

TABLE 14-continued

| Description | Rawstock and Coated Sheet Data | | | |
|---|---|---|---|---|
| | Rawstock | Ex. 12 | Ex. K | Ex. L |
| Color Calendered | | | | |
| L | — | 92.35 | 92.22 | 92.18 |
| a | — | 0.23 | 0.42 | 0.46 |
| b | — | 2.16 | 2.09 | 2.01 |
| Y.I. (Ger.) | — | 4.54 | 4.56 | 4.44 |
| W.I. (Stensby) | — | 86.54 | 87.20 | 87.50 |
| *Ink Gloss Calendered | — | 78.4 | 71.7 | 67.8 |
| I.G.T. Pick No. 7 Tack Ink Calendered | — | No Pick | No Pick | No Pick |

*Press Conditions:
Impression - 0.006"
Ink Loading - 1.0 CC

What is claimed is:

1. A treated clay for use as a filler in organic solvent-based paints and water-based paints to improve the gloss of dried films thereof and in paper coatings to improve the gloss ink holdout properties of paper coating with same, said treated clay consisting essentially of a mixture of kaolin clay particles and an effective amount of a nonionic surfactant compatible with water and oil and having an HLB value in the range of 3 to 15.

2. Treated clay as claimed in claim 1 wherein said surfactant has an HLB value in the range of 5 to 14.

3. Treated clay as claimed in claim 1 wherein said surfactant is present in an effective amount up to 5 wt. % of the total weight of said clay and surfactant.

4. Treated clay as claimed in claim 2 wherein said surfactant is present in an effective amount of up to 2 wt. % of the total weight of said clay and surfactant.

5. Treated clay as claimed in claim 2 wherein said surfactant is present in an effective amount of 0.75 to 1.25 wt. % of the total weight of said clay and surfactant.

6. Treated clay as claimed in claim 1 wherein said clay product contains less than 0.2 wt. % soluble salts based on the weight of said product.

7. Treated clay as claimed in claim 1 wherein said treated clay has a Hegman grind measurement (ASTM Method D-1210) of 5 to 6

8. Treated clay as claimed in claim 1 wherein said surfactant is nonylphenoxypoly(ethyleneoxy) ethanol having the general formula:

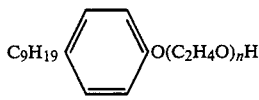

wherein n is an integer of 4 to 12.

9. Treated clay as claimed in claim 1 wherein said surfactant is nonylphenoxypoly(ethyleneoxy) ethanol having the general formula:

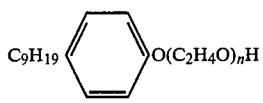

wherein n is an integer of 7 to 9.

10. Treated clay as claimed in claim 1 wherein said surfactant is a condensation product of ethylene oxide and a hydrophobic base formed by condensation of propylene oxide with propylene glycol and is represented by the general formula:

$$HO(C_2H_4O)_x(C_3H_9O)_y(C_2H_4O)_zH$$

wherein x, y and z are numbers of relative values providing an HLB in the range of 8 to 1.

11. Treated clay as claimed in claim 10 wherein said surfactant has an HLB value of 7 to 2.

12. Method of making a treated clay useful in organic solvent-based paints and water-based paints to improve the gloss of dried films thereof and in paper coatings to improve the gloss ink holdout properties of paper coated with same, comprising the steps of:
 (a) mixing an aqueous slurry of clay particles and an effective amount of a nonionic surfactant compatible with water and oil and having an HLB in the range of 3 to 15, thereby forming a mixture consisting essentially of said slurry and said surfactant; and
 (b) drying the resulting mixture to provide said treated clay.

13. Method as claimed in claim 12 wherein said aqueous slurry contains an alkaline material to increase the fluidity of said slurry.

14. Method as claimed in claim 13 wherein said alkaline material is sufficiently volatile as to be separated from said clay during said drying step (b).

15. Method as claimed in claim 14 wherein said alkaline material is ammonium hydroxide.

16. Method as claimed in claim 15 wherein the amount of ammonium hydroxide is in the range of 0.15 to 0.3 wt. % based on the dry weight of said clay.

17. Method as claimed in claim 12 wherein said treated clay after drying is pulverized to provide the product with a 5 to 6 Hegman grind measurement (ASTM Method D-1210).

18. A coating material comprising a binder, a volatilizable vehicle and as filler the treated clay claimed in claim 1.

19. A coating material as claimed in claim 18 wherein said vehicle is a volatilizable organic liquid and said filler is the treated clay claimed in claim 2.

20. A coating material as claimed in claim 18 wherein said vehicle is water and said filler is the treated clay claimed in claim 2.

21. A process for coating paper, which process comprises treating said paper with a coating composition consisting essentially of water, kaolin clay particles and an effective amount of a nonionic surfactant compatible with water and oil and having an HLB value in the range of 3 to 15.

22. A process as claimed in claim 21 wherein said surfactant has an HLB value in the range of 5 to 14.

23. A process as claimed in claim 21 wherein said surfactant is present in an effective amount up to 5 wt. % of the total weight of said clay and surfactant.

24. A process as claimed in claim 22 wherein said surfactant is present in an effective amount of up to 2 wt. % of the total weight of said clay and surfactant.

25. A process as claimed in claim 22 wherein said surfactant is present in an effective amount of 0.75 to 1.25 wt. % of the total weight of said clay and surfactant.

26. A process as claimed in claim 21 wherein said coating composition contains less than 0.2 wt. % soluble salts based on the total weight of said clay and surfactant.

27. A process as claimed in claim 21 wherein said clay has a Hegman grid measurement (ASTM Method D-1210) of 5 to 6.

28. A process as claimed in claim 21 wherein said surfactant is nonylphenoxypoly(ethyleneoxy) ethanol having the general formula:

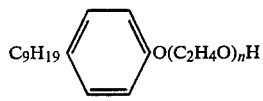

wherein n is an integer of 4 to 12.

29. A process as claimed in claim 21 wherein said surfactant is nonylphenoxypoly(ethyleneoxy) ethanol having the general formula:

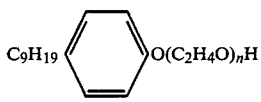

wherein n is an integer of 7 to 9.

30. A process as claimed in claim 21 wherein said surfactant is a condensation product of ethylene oxide and a hydrophobic base formed by condensation of propylene oxide with propylene glycol and is represented by the general formula:

$$HO(C_2H_4O)_x(C_3H_9O)_y(C_2H_4O)_zH$$

wherein x, y and z are number of relative values providing an HLB in the range of 8 to 1.

31. A process as claimed in claim 30 wherein said surfactant has an HLB value of 7 to 2.

32. A process as claimed in claim 21 wherein said paper is thereafter dried, thereby leaving said clay and said surfactant adhering to said paper.

33. Paper coated by a process according to claim 21.

* * * * *